(12) United States Patent
Moen et al.

(10) Patent No.: US 7,152,902 B2
(45) Date of Patent: Dec. 26, 2006

(54) TRUCK BED SHELTER

(76) Inventors: Russel J. Moen, 3199 Amoruso Way, Roseville, CA (US) 95747; Wendy Ann Moen, 3199 Amoruso Way, Roseville, CA (US) 95747

( * ) Notice: Subject to any disclaimer, the term of this patent is extended or adjusted under 35 U.S.C. 154(b) by 0 days.

(21) Appl. No.: 11/209,833

(22) Filed: Aug. 24, 2005

(65) Prior Publication Data

US 2006/0012212 A1    Jan. 19, 2006

Related U.S. Application Data

(62) Division of application No. 10/655,198, filed on Sep. 4, 2003.

(60) Provisional application No. 60/409,454, filed on Sep. 9, 2002.

(51) Int. Cl.
*B62D 25/06* (2006.01)

(52) U.S. Cl. .................. 296/100.18; 296/3; 135/88.13

(58) Field of Classification Search ........... 296/100.16, 296/100.17, 100.18, 104, 102, 3; 135/88.13
See application file for complete search history.

(56) References Cited

U.S. PATENT DOCUMENTS

| | | |
|---|---|---|
| D290,945 S | 7/1987 | Geisler |
| 4,756,325 A | 7/1988 | Daniels |
| 4,789,196 A | 12/1988 | Fields |
| 4,799,726 A | 1/1989 | Scott |
| 4,828,315 A | 5/1989 | Muirhead |
| 4,883,305 A | 11/1989 | Horton |
| 4,938,523 A | 7/1990 | Camp |
| 5,161,851 A | 11/1992 | Rafi-Zadeh |
| 5,186,513 A | 2/1993 | Strother |
| 5,238,288 A | 8/1993 | Chandler |
| 5,353,826 A | 10/1994 | Davis |
| D352,024 S | 11/1994 | Hebets |
| 5,364,154 A | 11/1994 | Kaiser |
| 5,385,377 A | 1/1995 | Girard |
| 5,423,587 A | 6/1995 | Ingram |
| 5,516,182 A | 5/1996 | Aragon et al. |
| 5,556,156 A | 9/1996 | Kirk |
| 5,752,736 A | 5/1998 | Nodier |
| 5,769,482 A | 6/1998 | Kirk |
| 5,931,521 A | 8/1999 | Kooiker |
| 5,951,092 A | 9/1999 | Cissell |
| 5,951,095 A | 9/1999 | Herndon |
| 6,425,618 B1 | 7/2002 | Garland et al. |
| 6,471,280 B1 | 10/2002 | Fowler |
| 6,719,345 B1 | 4/2004 | Ootsuka et al. |

*Primary Examiner*—Joseph D. Pape
(74) *Attorney, Agent, or Firm*—Kramer & Amado, P.C.

(57) ABSTRACT

A removable truck bed shelter for use with a truck bed having laterally spaced side ends. The removable truck bed shelter extends between and rests on the laterally spaced side ends to provide shelter to an animal housed in the truck bed. The removable truck bed shelter extends over only a portion of the open truck bed and provides a weather-resistant cover over the portion of te truck bed so enclosed. The removable truck bed shelter may be constructed as an adjustable frame with an attachable cover or as a solid piece of weather-resistant material. When constructed as an adjustable frame, telescoping center portions may be attached to the support members of the frame and include holes wherein a pin may be inserted to lock the frame in position.

15 Claims, 13 Drawing Sheets

TRUCK BED SHELTER

CROSS-REFERENCE TO RELATED APPLICATIONS

This is a Division of application Ser. No. 10/655,198 filed Sep. 4, 2003. The entire disclosure of the prior application is hereby incorporated by reference herein in its entirety.

This application claims the benefit of Provisional Patent Application Ser. Nr. 60/409,454 filed 2002 Sep. 9.

FEDERALLY SPONSORED RESEARCH

Not Applicable

SEQUENCE LISTING OR PROGRAM

Not Applicable

BACKGROUND OF THE INVENTION

1. Field of Invention

This invention relates to truck bed mounts, specifically to such truck bed mounts that are used to shelter animals in the back of pickup trucks.

2. Description of the Related Art

A variety of fixed, removable, and retractable enclosures for open areas of vehicles have been marketed and are known in the art. Some such enclosures have been designed to protect animals carried in the rear bed of pickup trucks. For instance, canvas tents have been made to attach to the bed of pick up trucks and provide shelter to dogs and people. However, these canvas tents are designed to be used when the truck is stationary, since a vehicle traveling at high speeds is subject to intense forces caused by the surrounding air. These forces can produce substantial drag and friction that work against the forward motion of the vehicle and can also cause the canvas tents to rip off and pose a hazard to other vehicles on the road. In addition, such tents often obstruct rear visibility and interfere with driving.

Other types of enclosures include hard shells that cover the truck bed to protect its contents. Typically, such shells are mounted to the open bed of the truck bed and are not easily removed. When installed, such shells prevent large objects from being stored in the truck bed, negating much of the usefulness of the pick up truck. Hard shells are also large, heavy and difficult to store.

Collapsible truck shells have been introduced that partially solve the aforementioned problems. These collapsible truck shells are typically composed of several frames of progressively decreasing sizes that, when collapsed, can be nestled within each other to form a generally planar configuration on the truck bed. However, such collapsible truck shells are not easily removed and include several distinct movable parts.

The aforementioned enclosures have proved to be difficult to install, remove, and use. In addition, the aforementioned enclosures have primarily been designed to hold cargo or provide camping shelter for persons and their pets. Furthermore, the aforementioned enclosures have presented other problems such as jamming or binding of movable parts sections as a result of the build-up of corrosion or water in their track-like devices which adversely affects the smooth operation of the enclosures. In addition, the aforementioned enclosures are often costly to purchase. The need has therefore arisen for a compact, lightweight, sturdy, and weather-resistant partial enclosure to provide shade and shelter for pets transported in the truck bed that can be easily installed and removed from a truck bed without significantly hampering the utility of having an open truck bed for cargo space.

BRIEF SUMMARY OF THE INVENTION

The present invention is an apparatus for sheltering at least a portion of the open bed of a vehicle and, in the preferred embodiment, comprises a frame with a removable cover. The frame comprises attachment members, support arches, and a means for adjusting the size of the frame to allow it to sit on truck beds of various sizes.

DETAILED DESCRIPTION OF THE INVENTION

Figure 1:
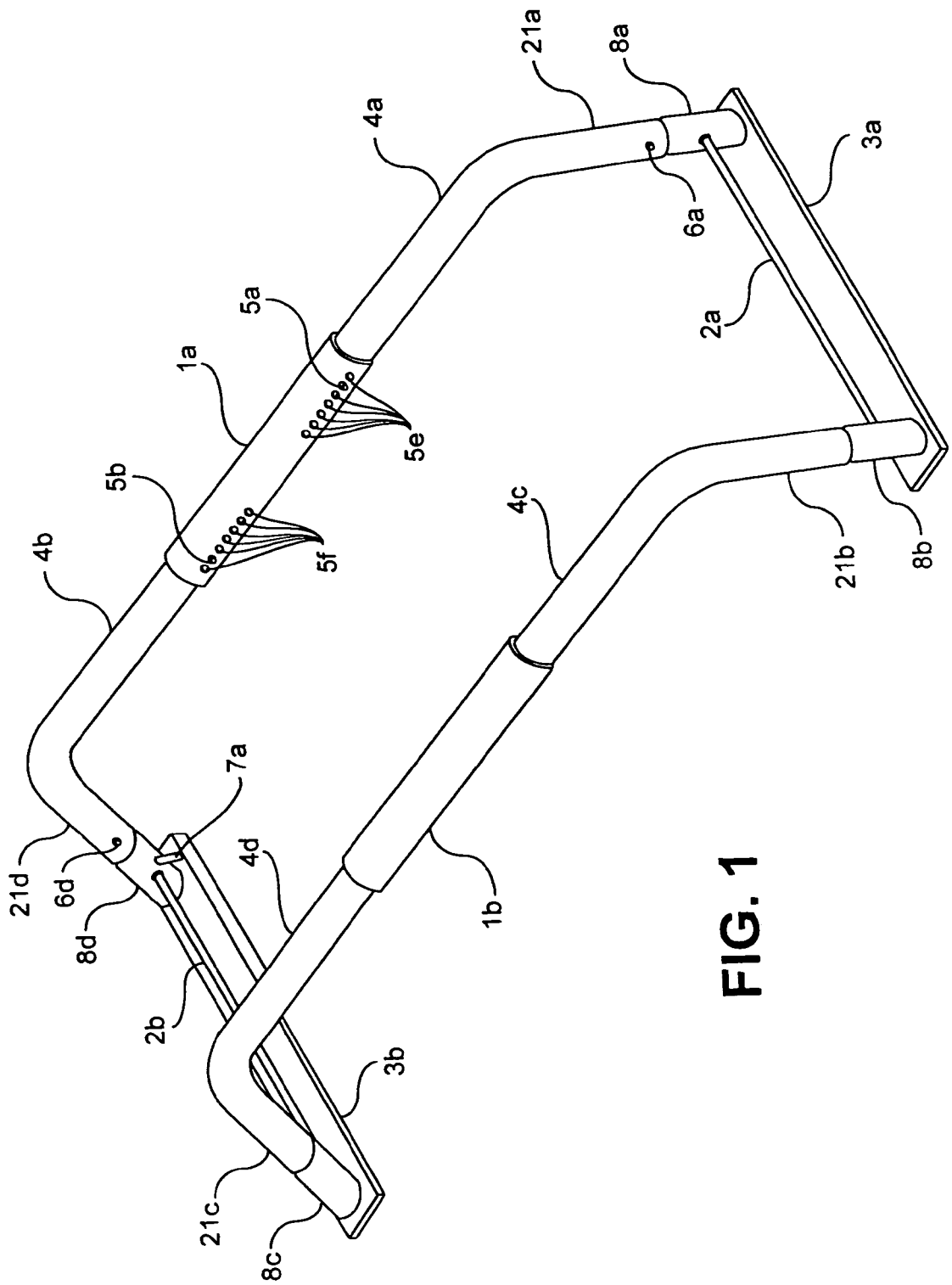
FIG. 1 is a top perspective view of an exemplary frame of an apparatus for covering at least a portion of an open bed of a vehicle in accordance with the present invention.

The present invention solves the problem of the aforementioned enclosures because it provides a lightweight, weather-resistant frame that fits over a portion of the truck bed and is easily removed and installed. The present invention does not significantly impair the driver's visibility and, because it only covers a portion of the truck bed, it does not significantly limit the cargo area of the truck bed. The present invention is also superior to the prior enclosures because it provides a compact shelter for animals in the truck bed, thereby protecting such animals from rain, flying debris, solar rays, and other potentially harmful elements and objects. The present invention shelters a portion of the truck bed nearest the cab to help keep sun, wind, and weather elements blocked from the area beneath the enclosure. The enclosure spans the width of the truck bed, and the frame of the enclosure can be made of any lightweight, sturdy material such as aluminum, flat metal or another metal, molded hard plastic, plastic tubing, PVC tubing, or galvanized tubing. However, in the preferred embodiment, the frame should be made of a lightweight metal.

The present invention comprises a removable cover that attaches to the frame. The aforementioned cover attaches to the frame of the enclosure in such a way as to create a shelter or shade for an animal housed beneath the enclosure, and said cover may be made of any material such as canvas, plastic, vinyl, or any other appropriate natural or synthetic material. Additionally, said cover may be made of any color, pattern, or size. In the preferred embodiment, the cover is made of a solid, weatherproof material and comprises outer sleeves that slide onto the frame of the enclosure and further comprises straps that allow the cover to be stretched tightly on the frame.

The present invention can be constructed in any size so as to fit all beds of pickup trucks, and the aforementioned frame may be constructed either fully welded or with the respective parts otherwise assembled so as to be ready for use without any assembly, or it may be constructed with partial or no welding to allow it to be shipped in a more compact package and thus require some assembly by the consumer. In an alternative embodiment of the present invention, the invention is a solid piece of material that requires no assembly.

The present invention can be attached to the bed of a pickup truck in several ways, such as using clamps, bolts, or ties, or any combination thereof. The present invention may be made in different shapes. For example, the frame of the present invention may form an arch over the truck bed or, alternatively, it may present a flat, raised surface and sit on top of the truck bed, resting on the rails or laterally spaced side ends of the truck bed, like a table. The present invention may optionally include a fitted rubber, neoprene, foam, or similar padded material that may be fashioned in a variety of shapes to fit the frame so as to protect the truck bed rail and help frictionally retain the frame of the enclosure to the truck bed.

Additionally, in one embodiment of the present invention, it may include a water mister similar to those typically used in greenhouses and dog kennels that could be attached to the underside of the support arches of the enclosure. Such a mister would act to cool an animal housed beneath the enclosure. The mister attached to the support arches of the enclosure may be used with a standard garden or multipurpose sprayer, preferably of the hand pump type, and such a sprayer would be attached to the mister and provide water storage and water pressure.

Accordingly, several objects and advantages of the present invention are as follows:

(a) to overcome the aforementioned problems of the prior art in creating a removable cover for the truck bed;

(b) to provide a cost-effective truck bed enclosure that is easily installed and removed;

(c) to provide a truck bed enclosure that offers adequate shade and shelter to pets in the truck bed; and (d) to provide a truck bed enclosure that does not significantly interfere with the cargo-carrying capabilities of the truck bed.

DETAILED DESCRIPTION OF THE DRAWINGS

Figure 2:
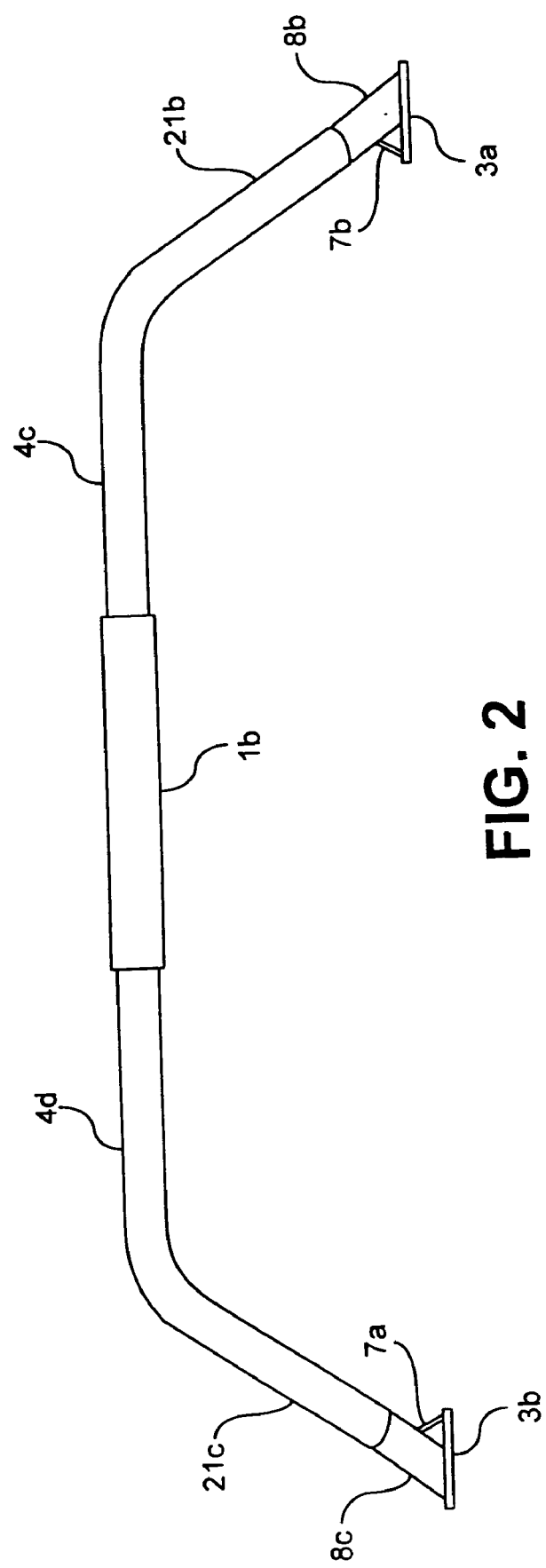
FIG. 2 is a side view of an exemplary frame of an apparatus for covering at least a portion of an open bed of a vehicle in accordance with the present invention.

Referring now to the drawings wherein the showings are for purposes of illustrating preferred embodiments of the present invention only and not for purposes of limiting the same, FIG. 1 is a top perspective view of an exemplary frame of an apparatus for covering at least a portion of an open bed of a vehicle in accordance with the present invention. Telescoping center portions 1a and 1b are identical to one another and attach to support arches. Said support arches comprise linking members 4a–4d, legs 21a–21d, and connecting members 8a–8d. Said telescoping center portions connect to said support arches by connecting directly to said linking members 4a–4d. Holes are set in each of the telescoping center portions 1a and 1b and allow the frame size to be adjusted. The exemplary embodiment of the holes are shown in 5e and 5f for one of the telescoping center portions, specifically telescoping center portion 1a. Pin members as shown by 5a and 5b are releasably inserted into the holes to lock the frame into position. Linking members 4a–4d are furthermore attached to legs 21a–21d, and linking members 4a–4d may be welded to legs 21a–21d, or otherwise attached. Legs 21a–21d each optionally include one hole that may be fitted with a corner pin, as shown by 6a and 6d. Attachment members 3a and 3b are attached to legs 21a–21b and 21c–21d, respectively, by connecting members 8a–8b and 8c–8d, respectively. Connecting rods 2a and 2b attach between connecting members 8a–8b and 8c–8d, respectively. The preferred embodiment of the invention includes an optional angle support 7a that attaches to connecting member 8d and attachment member 3b. A similar optional angle support 7b is shown in FIG. 2 and attaches to connecting member 8a of FIG. 1. These optional angle supports may be used to attach a dog restraint such as a leash or tether and, in the preferred embodiment, are positioned on the part of the frame closest to the front cab of the vehicle, though they may be positioned elsewhere. Corner pins 6a and 6d may be withdrawn or depressed to allow legs 21a and 21d to detach from connecting members 8a and 8d, respectively. Not shown but implied in the figure are corner pins 6b and 6c set into legs 21b and 21c, respectively.

FIG. 2 represents a side view of the frame, showing telescoping center portion 1b, and linking members 4c and 4d connected to legs 21b and 21c. Leg 21c is connected to connecting member 8c, which is connected to attachment member 3b. Leg 21b is connected to connecting member 8b, which is connected to attachment member 3a. Optional angle support member 7b is attached to connecting member 8a, which is positioned behind 8b in this side perspective and therefore not visible.

Figure 3:
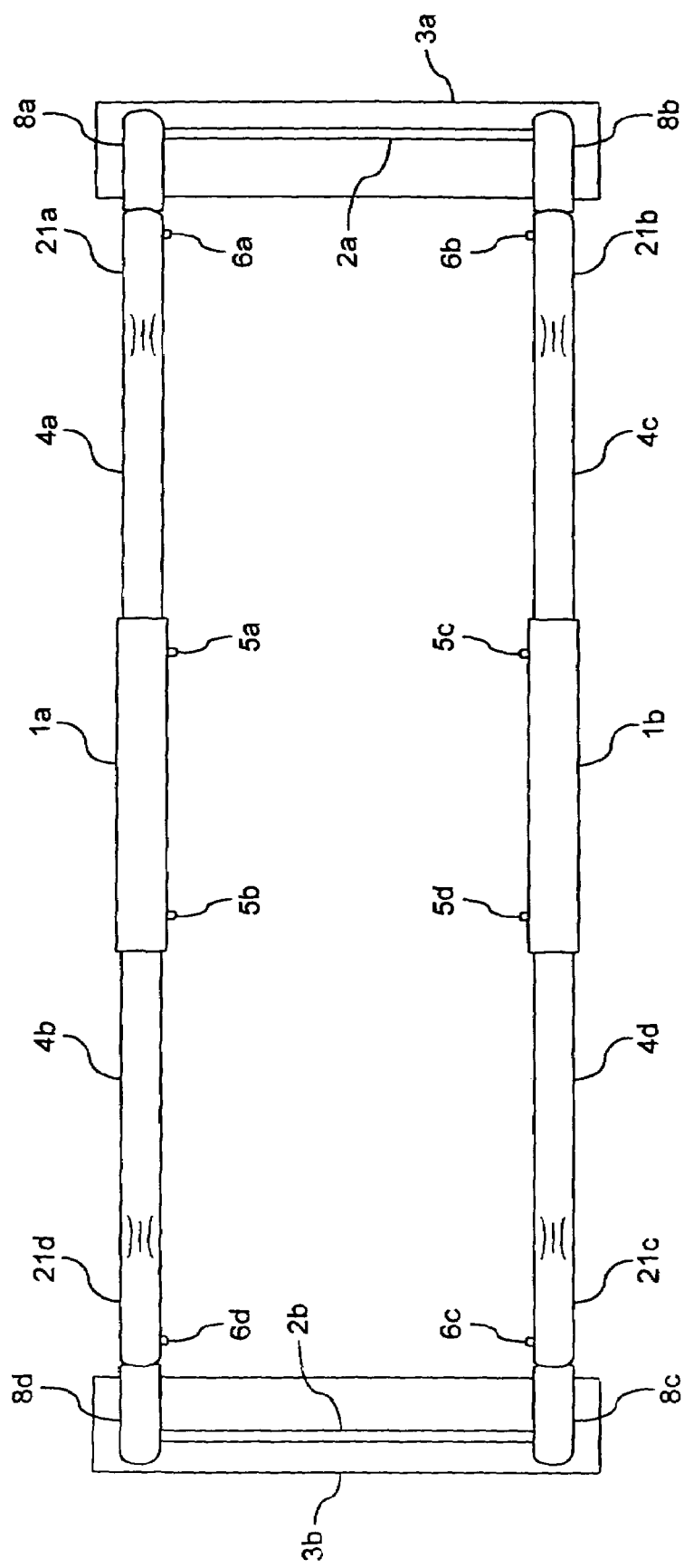
FIG. 3 is a top view of an exemplary frame of an apparatus for covering at least a portion of an open bed of a vehicle in accordance with the present invention.

FIG. 3 depicts a top view of the frame and shows the corner pins 6a and 6b as well as corner pins 6c and 6d. Also pin members 5a–5d are visible.

Figure 4:
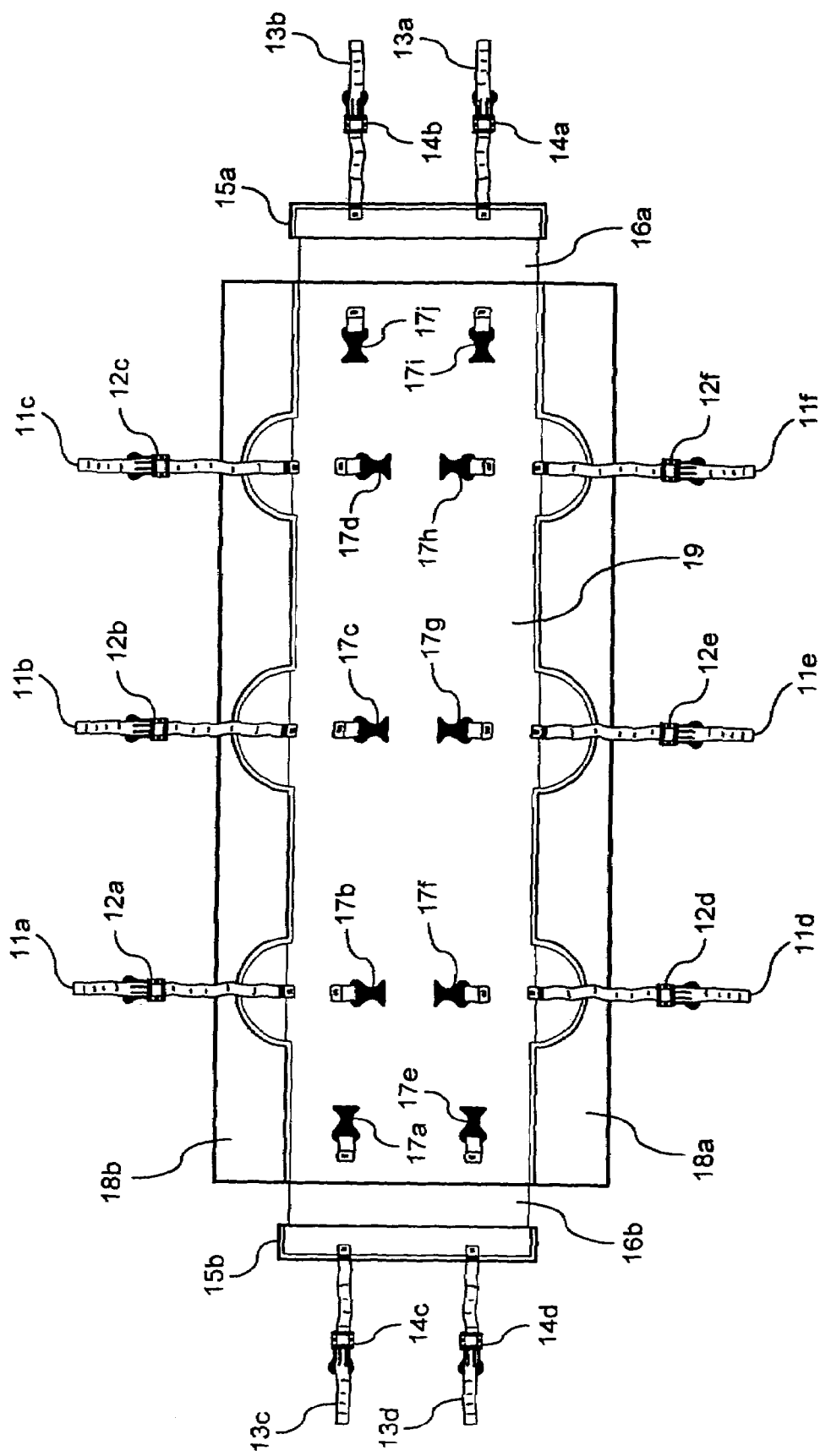
FIG. 4 is a top view of the cover, showing the interior side that attaches to a frame of an apparatus for covering at least a portion of an open bed of a vehicle in accordance with the present invention.

FIG. 4 is a top view of the cover that fits over the frame of the apparatus. Side straps 11a–11f and interior straps 17a–17j are attached to the body 19 of the cover. Outer straps 13a and 13b attach to edge 15a, and outer straps 13c and 13d attach to opposing edge 15b as depicted. First and second opposing edges 15a and 15b are attached to the body 19 of the cover by connecting flaps 16a and 16b, respectively. Side straps 11a–11f and outer straps 13a–13d attach around portions of the frame. Sleeves 18a and 18b slide over the frame of the apparatus, specifically parts 21a–21d and 4a–4d and 1a-1b of as depicted in FIGS. 1–3. Side straps 11a–11c are attached to corresponding insert clips 12a–12c. Side straps 11d–11f are attached to corresponding insert clips 12d–12f. Insert clips 12a–12c snap into the corresponding holding clips 17b–17d. Insert clips 12d–12f snap into the corresponding holding clips 17f–17h. Outer straps 13c and 13d are attached to end insert clips 14c and 14d, respectively. Outer straps 13a and 13b are attached to end insert clips 14a and 14b, respectively. End insert clips 14c and 14d snap into holding clips 17a and 17e, respectively. End insert clips 14a and 14b snap into holding clips 17i and 17j, respectively. The outer straps and side straps may be adjusted to adjust the tension of the cover when it is attached to the frame.

Figure 5:
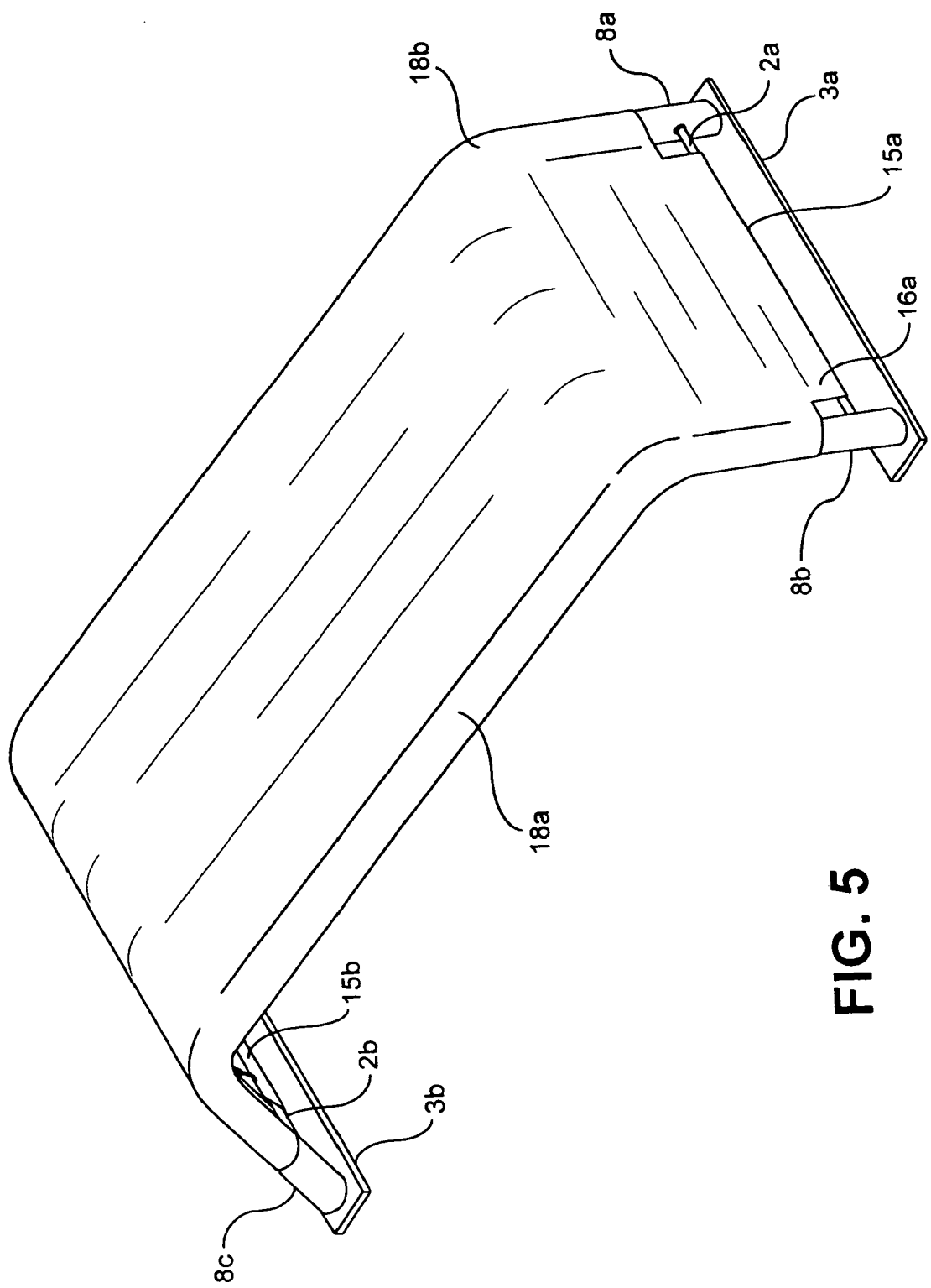
FIG. 5 is a top perspective view of a frame with a cover in accordance with the present invention.

FIG. 5 depicts the frame with the cover attached, showing how sleeves 18a and 18b attach to the frame. Sleeves 18a and 18b slide over legs 21b–21c and 21a–21d, linking members 4c–4d and 4a–4b, and telescoping center portions 1a and 1b. First and second opposing edges 15a and 15b attach to connecting rods 2a and 2b. Because the cover may slide over the support arches with either side first, either sleeve may slide over either support arch.

Figure 6:
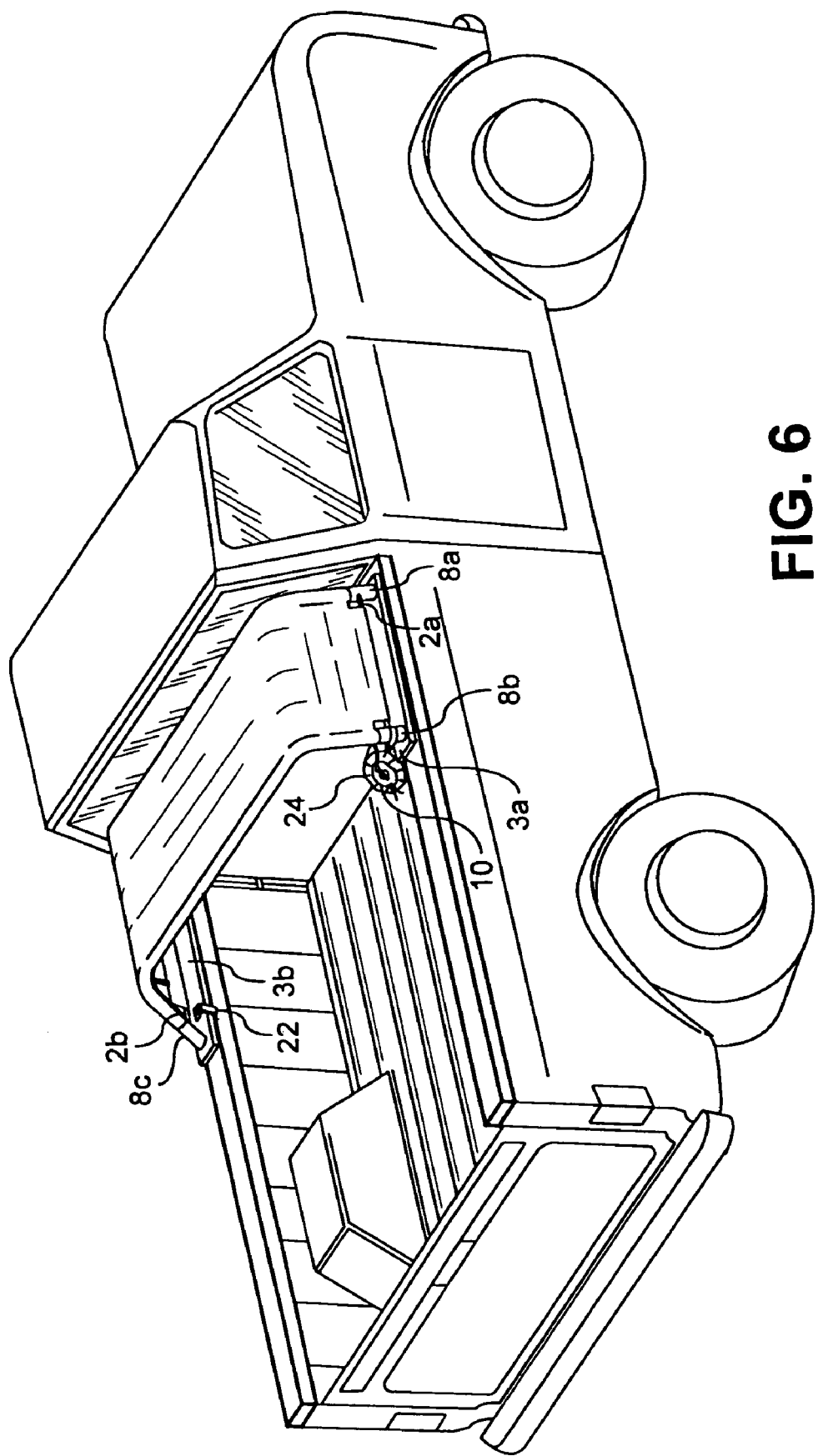
FIG. 6 is a side top perspective view of a frame with a cover installed on the open bed of a truck in accordance with the present invention.

FIG. 6 shows the frame and cover installed in the open bed of a truck. Attachment members 3a and 3b secure to the laterally spaced side ends of the open bed of the truck. Any appropriate clamp, as shown by component 22 may be used to secure the attachment members to the laterally spaced side ends. Optionally, the water mister 10 can be attached to the support arches. An optional cinch bag 24 may be placed over the water mister for insulation.

Figure 7:
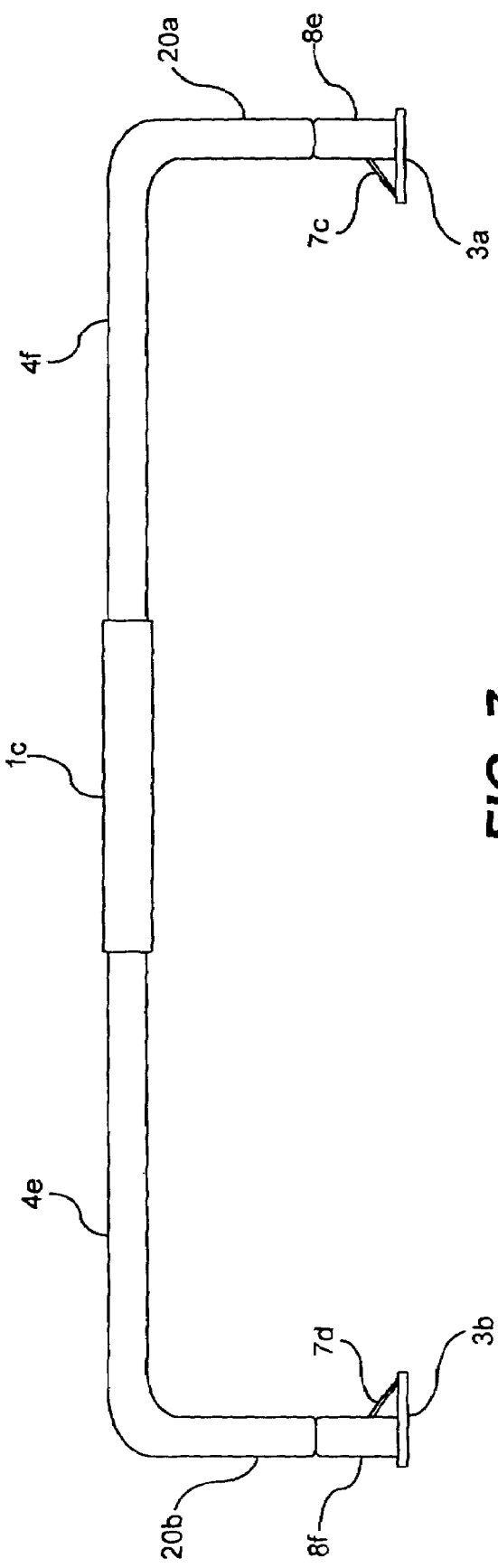
FIG. 7 is a side view of a second embodiment of a frame of an apparatus for covering at least a portion of an open bed of a vehicle in accordance with the present invention.

FIG. 7 depicts an alternative embodiment of the present invention, showing the frame with the legs 20a and 20b at approximately right angles to the linking members 4e and 4f. Not shown but implied in this figure are the opposing legs and linking members, identical in structure and position.

Figure 8:
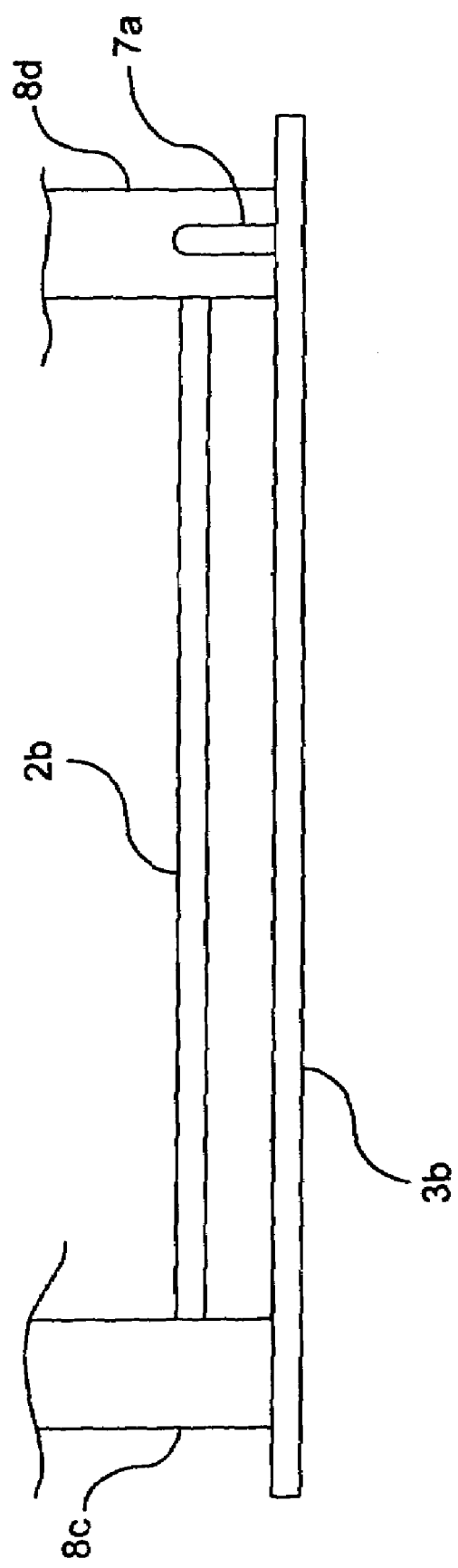
FIG. 8 is a front exploded view of one of the attachment members.

FIG. 8 depicts an exploded front view of the one of the attachment members of the frame, showing the preferred angle support member above the attachment member.

Figure 9:
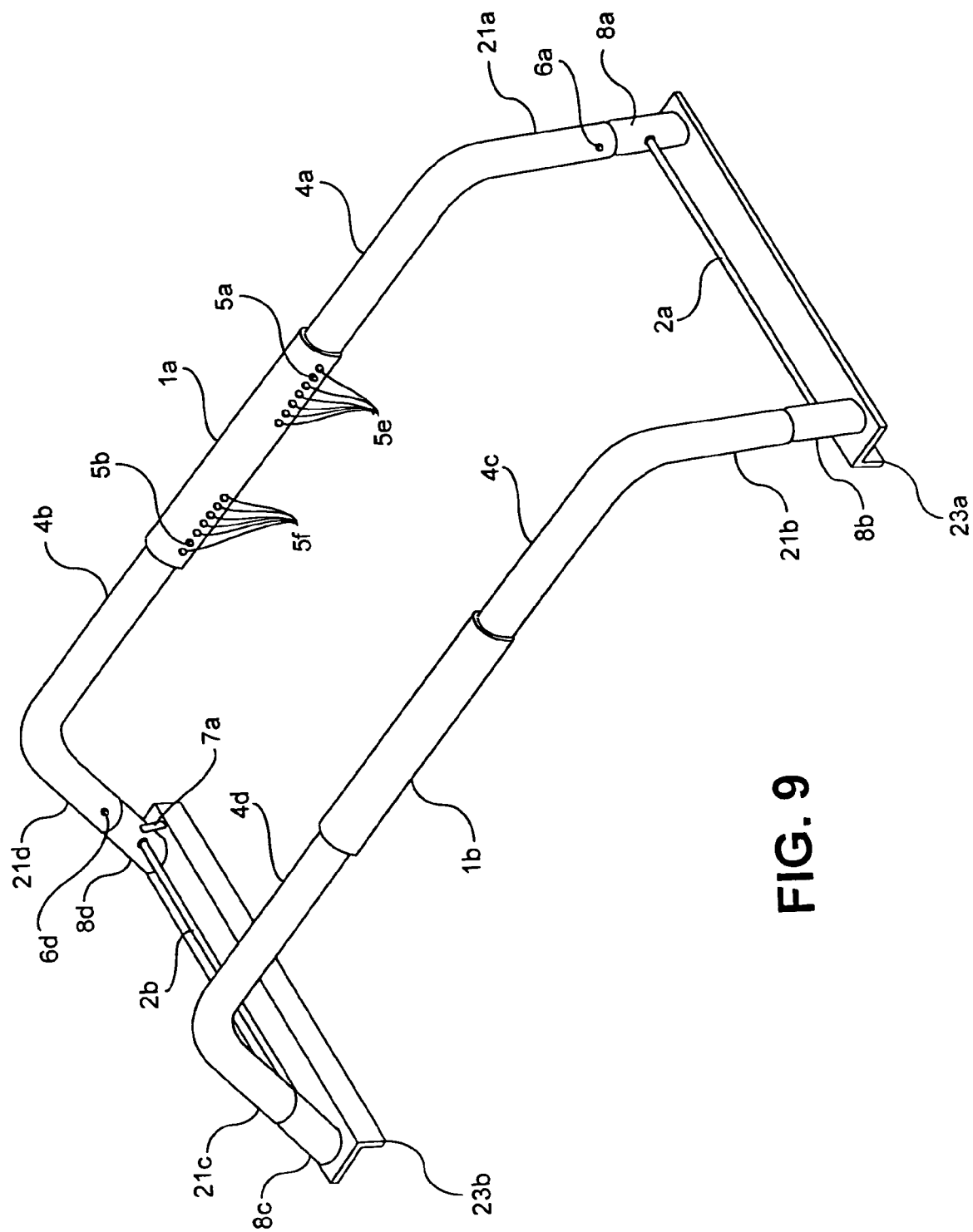
FIG. 9 is a top perspective view of an alternative embodiment of the invention showing a perpendicular support member on each of the attachment members.

FIG. 9 is a top perspective view that depicts an alternative embodiment of the frame of an apparatus for covering at least a portion of an open bed of a vehicle in accordance with the present invention. In this embodiment, each attachment member is attached to a perpendicular support member 23a–23b that helps stabilize the frame with the attachment members resting on the laterally spaced side ends.

Figure 10:
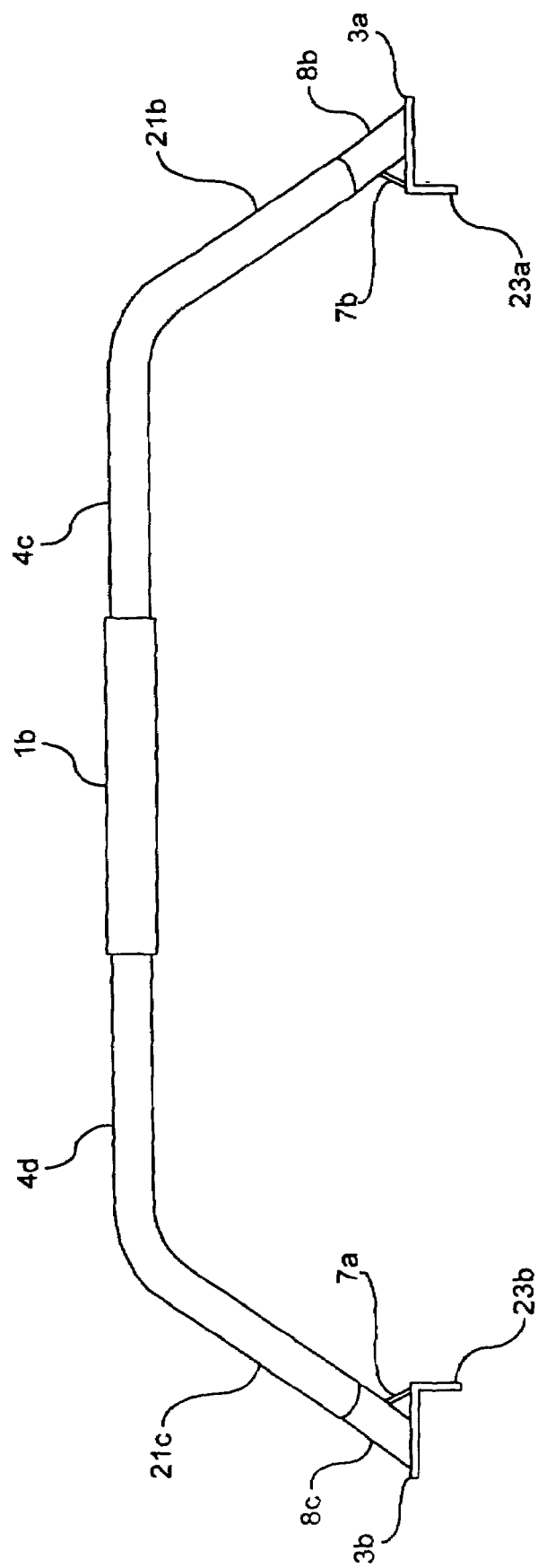
FIG. 10 is a side view of the alternative embodiment of the invention showing the perpendicular support members on the attachment members.

FIG. 10 is a side view of the frame showing the perpendicular support members 23a and 23b connected to the attachment members 3a and 3b, respectively.

Figure 11:
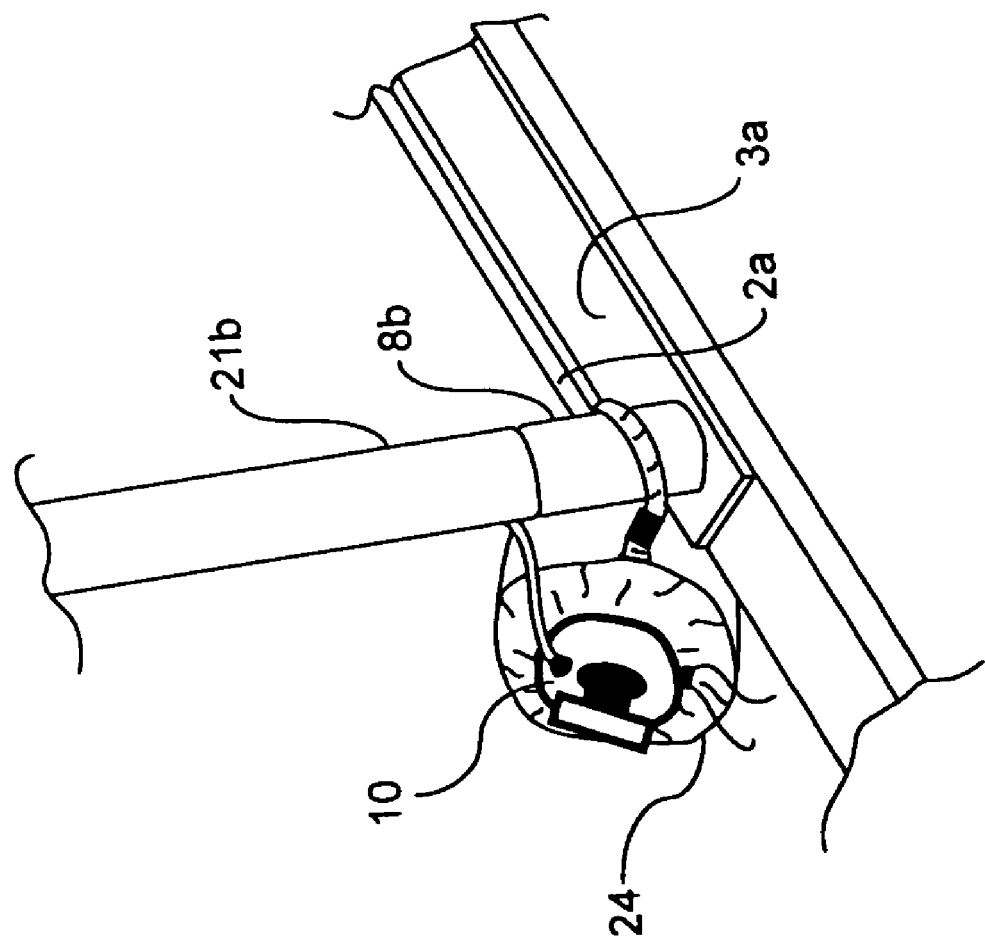
FIG. 11 is an exploded view of the optional mister attached to a portion of the support arches.

FIG. 11 is an exploded view of an alternative embodiment of the present invention showing an optional water mister attached to connecting member 8b with the optional cinch bag 24 covering the water mister. Said water mister may be attached to any convenient location on the frame.

Figure 12:
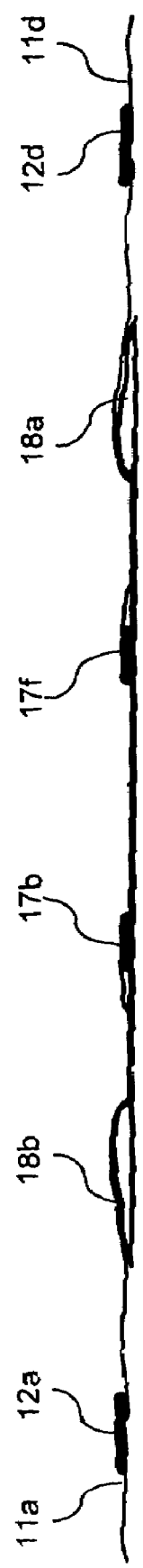
FIG. 12 is a side view of the cover showing the sleeves of the cover that slide over the support arches.

FIG. 12 is a side view of the cover that fits over the frame and shows sleeves 18a and 18b.

Figure 13:
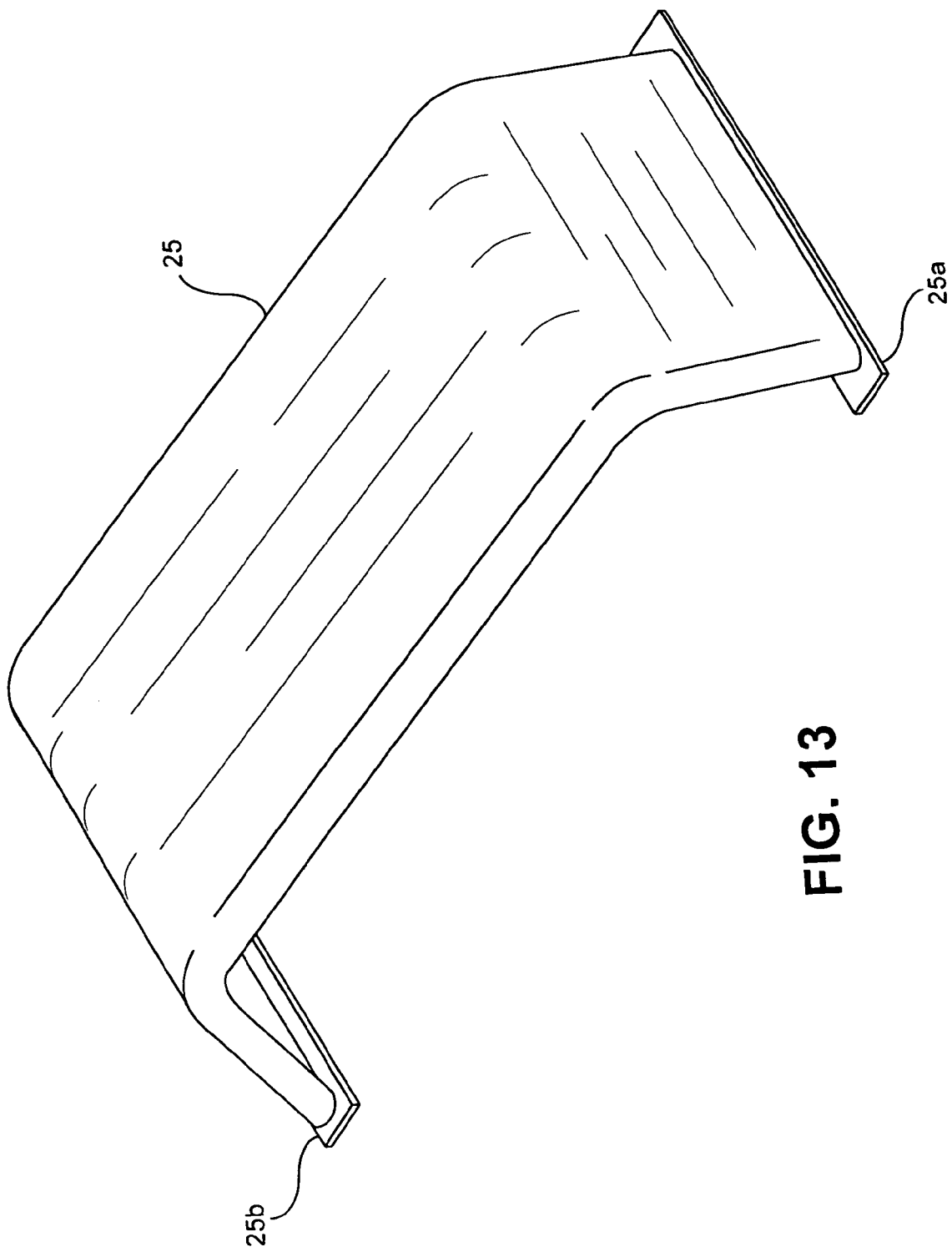
FIG. 13 shows the invention as a solid piece of weather-resistant material.

FIG. 13 shows a top perspective of an alternative embodiment of the present invention wherein the frame is a solid piece of weatherproof material with a body 25 and resting support members 25a and 25b at opposing lateral ends.

What is claimed is:

1. An apparatus for covering a portion of an open bed of a vehicle, the open bed of a vehicle having longitudinally spaced forward and rearward ends and laterally spaced side edges, said apparatus comprising:
a frame, said frame comprising:
a base having first and second laterally spaced elongated generally flat rectangular attachment members for attachment to the open bed of a vehicle, and first and second longitudinal members; and
first and second elongated support arches connected between first ends and second ends of said attachment members,
wherein said first and second longitudinal members are connected between said first and second elongated support arches; and
an elongated thin flat cover panel for covering at least a part of the open bed, said cover panel having opposing side edges and end edges wherein said side edges attach to said support arches and said end edges attach to said base.

2. The apparatus according to claim 1 wherein said attachment members attach to the laterally spaced side edges of the open bed of a vehicle.

3. The apparatus according to claim 1 wherein said support arches include telescoping center portions for selectively adjusting said support arches so that said frame may be adjusted to fit open beds of varying sizes.

4. The apparatus according to claim 1 wherein said first longitudinal member is substantially parallel to said first rectangular attachment member and said second longitudinal member is substantially parallel to said second rectangular attachment member.

5. The apparatus according to claim 1 wherein said end edges of said elongated thin flat cover panel attach to said base by wrapping around said longitudinal members.

6. The apparatus according to claim 1 wherein the thin flat cover panel has a fixed size, the distance between the rectangular attachment members is adjustable, and said end edges of said thin flat cover panel attach to said base so as to allow the thin flat cover panel to adjust to changes in the distance between the rectangular attachment members.

7. The apparatus according to claim 6 wherein said end edges of said elongated thin flat cover panel attach to said base by wrapping around said longitudinal members.

8. The apparatus according to claim 1 wherein said first and second longitudinal members are connecting rods having a fixed length.

9. The apparatus according to claim 8 wherein said connecting rods provide support to the support arches.

10. The apparatus according to claim 1 wherein said support arches each comprise a pair of opposed substantially L shaped tubular members attached together at one or more telescoping center portions wherein said telescoping center portions comprise a plurality of individual holes for receiving a pin member at selected extended positions.

11. The apparatus according to claim 1 wherein said cover panel comprises a pliable sheet of material and fastening means for selectively and releasably fastening said cover panel to said frame whereby said cover panel provides shelter over a portion of said vehicle bed.

12. The apparatus according to claim 1 wherein said cover panel comprises a flexible material that is resistant to temperature extremes and provides shelter from wind, rain, and solar energy, and fastening means for selectively and releasably fastening said cover panel to said frame whereby said cover panel provides shelter over a portion of said vehicle bed.

13. The apparatus according to claim 1 wherein said cover panel comprises a flexible shade cloth material and fastening means for selectively and releasably fastening said cover panel to said frame whereby said cover panel provides shelter over a portion of said vehicle bed.

14. The apparatus according to claim 1 wherein said cover panel includes tubular sleeves formed along the opposing side edges thereof for receiving and attaching to said support arches.

15. The apparatus according to claim 1 wherein
the cover panel is a substantially solid piece of rigid material having end edges, and
said end edges attach to said first and second rectangular attachment members.

* * * * *